US012730775B2

(12) United States Patent
K et al.

(10) Patent No.: US 12,730,775 B2
(45) Date of Patent: Sep. 8, 2026

(54) FALLBACK TO BRIDGING IN PROGRAMMABLE NETWORK ASICS

(71) Applicant: Arista Networks, Inc., Santa Clara, CA (US)

(72) Inventors: Vishnu Vardhan K, Bangalore (IN); Basil Saji, Bangalore (IN); Anirudh Singh, Bangalore (IN); Ram Prasad Gudiwada, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 23 days.

(21) Appl. No.: 19/039,349

(22) Filed: Jan. 28, 2025

(65) Prior Publication Data

US 2026/0220080 A1 Jul. 30, 2026

(51) Int. Cl.
*G06F 15/78* (2006.01)
*G06F 15/76* (2006.01)

(52) U.S. Cl.
CPC .... *G06F 15/7878* (2013.01); *G06F 2015/763* (2013.01)

(58) Field of Classification Search
CPC ............................ G06F 15/78; G06F 15/7825
See application file for complete search history.

(56) References Cited

U.S. PATENT DOCUMENTS 6,754,211 B1 * 6/2004 Brown .................... H04L 69/22 709/219
7,453,899 B1 * 11/2008 Vaida ...................... H04L 45/00 370/419
2014/0043962 A1 * 2/2014 Rangan ............... H04L 41/0668 370/252
2022/0019552 A1 * 1/2022 Wilkinson ........ G06F 15/17337
2024/0305663 A1 * 9/2024 Routt .................. H04L 63/1441

FOREIGN PATENT DOCUMENTS

WO WO-2004073264 A1 * 8/2004 ............. H04L 47/70

* cited by examiner

*Primary Examiner* — Jacob Petranek
(74) *Attorney, Agent, or Firm* — Fountainhead Law Group, PC

(57) ABSTRACT

Techniques are provided that enable a programmable network application-specific integrated circuit (ASIC) to switch over from L3 forwarding (i.e., routing) to L2 forwarding (i.e., bridging) an L3 network packet in certain scenarios, such as a scenario in which the packet fails to meet one or more criteria defined by a routing protocol. In various embodiments, this switchover (referred to as "fallback to bridging") is achieved by leveraging programmable aspects of the ASIC's packet processing pipeline.

20 Claims, 5 Drawing Sheets

FALLBACK TO BRIDGING IN PROGRAMMABLE NETWORK ASICS

BACKGROUND

Some network devices employ programmable application-specific integrated circuits (ASICs) to perform Layer 2 (L2) packet forwarding (also known as bridging) and Layer 3 (L3) packet forwarding (also known as routing). Such ASICs, referred to as programmable network ASICs, are designed to carry out bridging and routing in hardware but can also be programmed via software to customize the manner in which these functions are performed.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to techniques that enable a programmable network ASIC to switch over from L3 forwarding (i.e., routing) to L2 forwarding (i.e., bridging) an L3 network packet in certain scenarios, such as a scenario in which the packet fails to meet one or more criteria defined by a routing protocol. In various embodiments, this switchover (referred to as "fallback to bridging") is achieved by leveraging programmable aspects of the ASIC's packet processing pipeline.

1. Example Network Device

Figure 1:
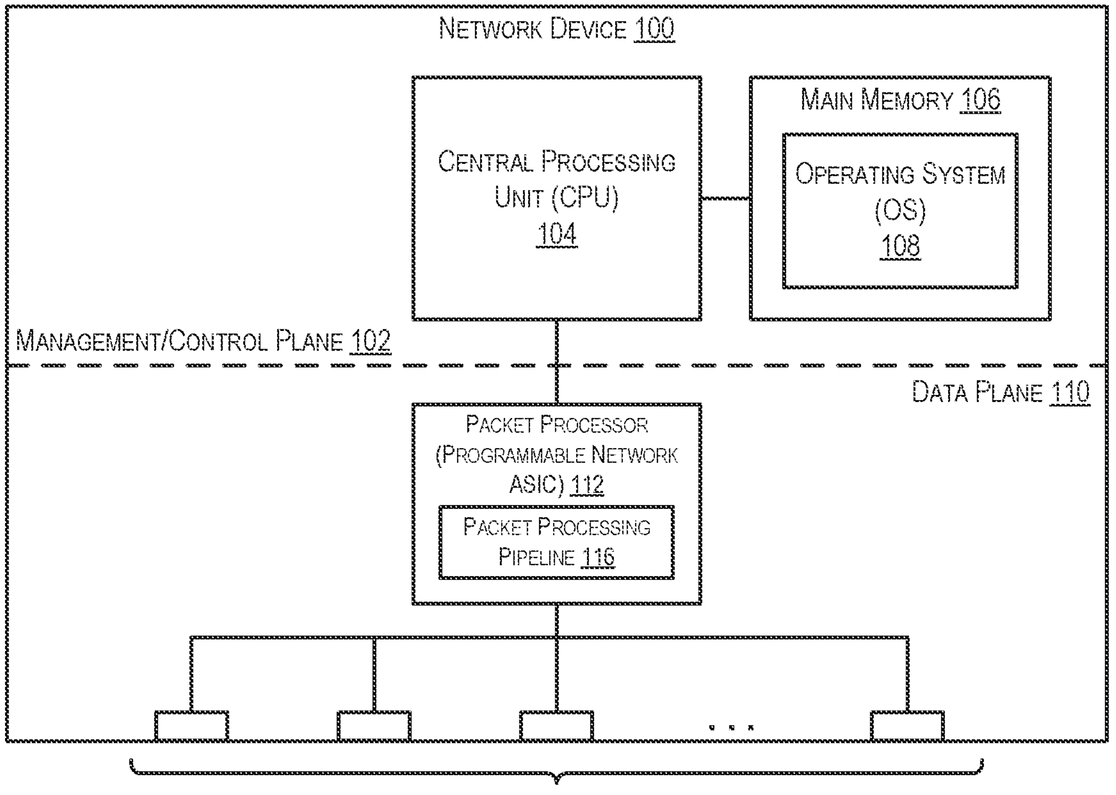
FIG. 1 depicts an example network device in accordance with certain embodiments of the present disclosure.

FIG. 1 is a simplified block diagram of a network device (e.g., switch or router) 100 in which the techniques of the present disclosure may be implemented. Network device 100 comprises a management/control plane 102 that includes a central processing unit (CPU) 104 and a main memory (e.g., random-access memory or RAM) 106. CPU 104 is a general-purpose processor that is responsible for managing the configuration/operation of network device 100 and controlling the device's understanding of the network in which it resides. CPU 104 carries out these functions under the direction of an operating system (OS) 108 that runs on CPU 104 from main memory 106.

In addition, network device 100 comprises a data plane 110 including a packet processor 112 and a set of physical front-panel interfaces (i.e., ports) 114. Packet processor 112 is a specialized hardware component that is responsible for processing, at line speed, streams of network traffic (i.e., packets) that pass through network device 100 via front-panel interfaces 114. The processing performed by packet processor 112 includes, among other things, bridging and routing ingress (i.e., incoming) L2 and L3 packets. For example, upon receiving an ingress L2 packet (which has an L2 header), packet processor 112 can bridge the packet in accordance with L2 information (e.g., a destination Media Access Control (MAC) address) found in its L2 header. Further, upon receiving an ingress L3 packet (which has both an L3 header and an L2 header), packet processor 112 can route the packet in accordance with L3 information (e.g., a destination Internet Protocol (IP) address) found in the packet's L3 header or, in certain circumstances, can bridge the packet in accordance with the L2 information found in its L2 header.

As shown in FIG. 1, packet processor 112 is implemented using a programmable network ASIC, which is a type of integrated circuit that is designed to execute bridging and routing (and other related functions) via a hardware-based packet processing pipeline 116 but can also be programmed by software running on CPU 104 (such as, e.g., OS 108) to modify certain aspects of the pipeline's behavior. This programmability allows users of network device 100 to customize the manner in which the bridging and routing functions are performed and is achieved using programmable logic resources present in pipeline 116.

Figure 2:
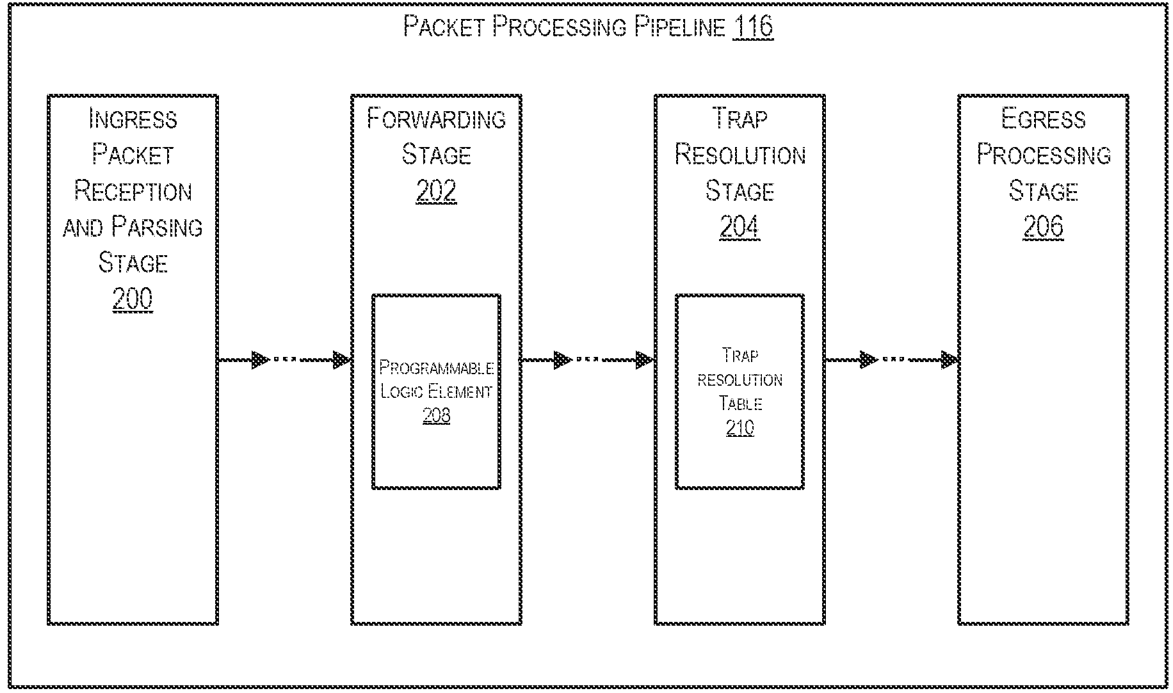
FIG. 2 depicts an example packet processing pipeline in accordance with certain embodiments of the present disclosure.

By way of example, FIG. 2 depicts a simplified block diagram of the architecture of packet processing pipeline 116 according to certain embodiments. As shown in FIG. 2, packet processing pipeline 116 comprises a number of pipeline stages including, among other things, an ingress packet reception and parsing stage 200, a forwarding stage 202, a trap resolution stage 204, and an egress processing stage 206. Ingress packet reception and parsing stage 200 is generally configured in hardware to receive an ingress L2/L3 packet that has arrived at network device 100 on a logical interface mapped to one or more of front-panel interfaces 114, determine various properties associated with the packet that are relevant to bridging/routing (e.g., identifier (ID) of the virtual local area network (VLAN) to which the packet belongs, ID of the ingress logical interface, packet header fields, etc.), add the determined properties to a pipeline metadata object for the packet, and pass the packet with its pipeline metadata to the next downstream pipeline stage.

Forwarding stage 202 is generally configured in hardware to decide whether the packet should be bridged (i.e., L2 forwarded) or routed (i.e., L3 forwarded), perform a lookup into an appropriate hardware table (or set of tables) based on this decision in order to retrieve L2 or L3 forwarding information for the packet, update the pipeline metadata of the packet using the retrieved L2/L3 forwarding information, and pass the packet with its updated pipeline metadata to the next downstream pipeline stage. Forwarding stage 202 includes a programmable logic element 208 that can be programmed via software to execute additional user-defined operations at this stage in the pipeline.

Trap resolution stage 204 is generally configured in hardware to determine whether any of a number of predefined traps (i.e., exceptions) have been set for the packet in a prior pipeline stage and, if so, execute one or more actions that are mapped to the set trap(s). These actions can, for example, modify the packet's header or modify aspects of the packet's pipeline metadata. The mappings between traps and actions are defined in a hardware trap resolution table 210 that is associated with trap resolution stage 204 and can be configured by the control plane.

Finally, egress processing stage 206 is generally configured in hardware to prepare the packet for forwarding to its next destination(s) (e.g., update/add packet headers, enqueue the packet on an appropriate egress queue, etc.). The packet is thereafter transmitted out of network device 100 on one or more front-panel interfaces 114, thereby completing the bridging or routing of the packet.

2. Solution Overview

In some cases, programmable network ASIC 112 will determine that an ingress L3 packet (i.e., a packet with both L2 and L3 headers) should be routed and initiate the routing process via its packet processing pipeline 116, but ultimately fail to route the packet for one reason or another. For instance, the routing attempt may fail because programmable network ASIC 112 cannot find valid L3 forwarding information for the packet in a routing table, known as an L3 forwarding information base (FIB). Alternatively, the routing attempt may fail for other reasons, despite the fact that there is valid L3 forwarding information of the packet in the L3 FIB. For example, in the context of L3 multicast forwarding (and specifically the Bidirectional Protocol Independent Multicast (PIM) feature, known as BIDIR-PIM), the routing attempt may fail because the ingress interface on which the L3 packet is received is not a "designated forwarder" interface.

Some existing programmable network ASICs natively support in hardware the ability to bridge, rather than route, an ingress L3 packet in the specific scenario where the packet cannot be routed due to a lack of valid L3 forwarding information in the L3 FIB. This functionality is referred to as fall back to bridging. However, these existing ASICs do not provide native hardware support for fall back to bridging in other routing failure scenarios like the multicast forwarding use case above.

Figure 3:
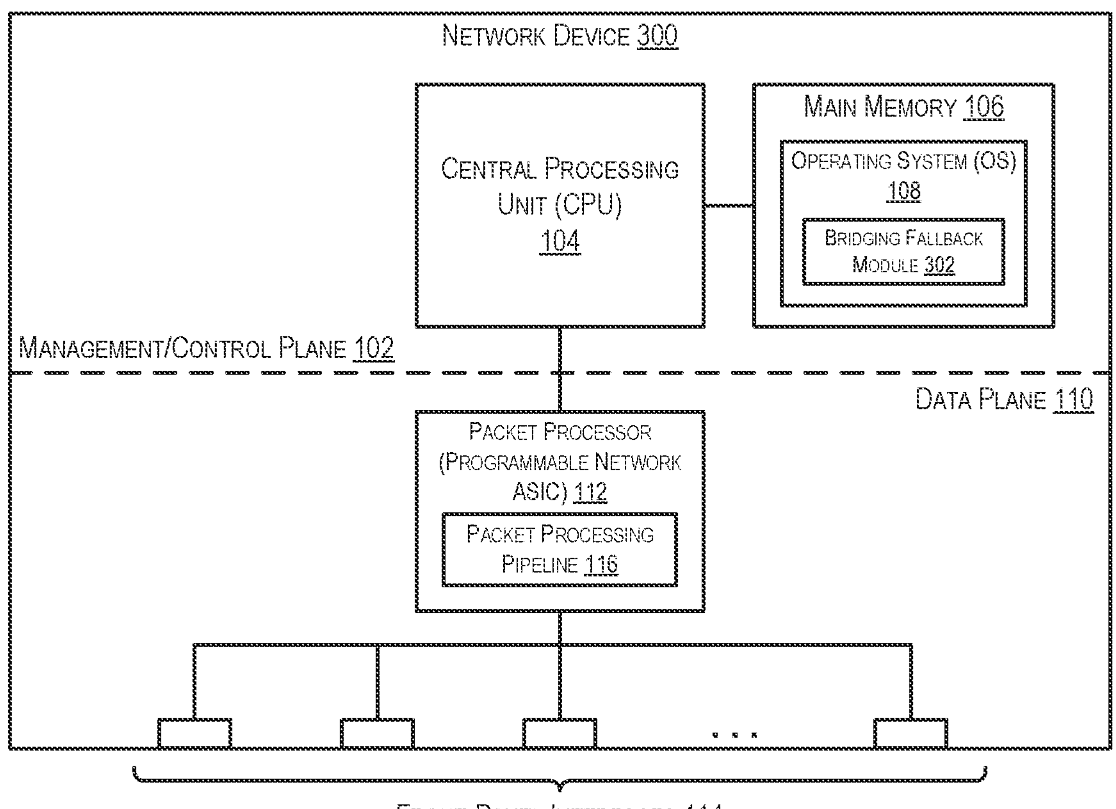
FIG. 3 depicts another example network device in accordance with certain embodiments of the present disclosure.

To address the foregoing limitation, FIG. 3 depicts an enhanced version (300) of network device 100 of FIG. 1 that includes a novel bridging fallback module 302 within OS 108. In various embodiments, bridging fallback module 302 implements techniques that leverage the programmability of programmable network ASIC 112 to enable the ASIC to fallback to bridging in scenarios where the ASIC cannot route an ingress L3 packet for a reason other than a lack of valid L3 forwarding information in the L3 FIB. These techniques generally involve loading program code into one or more programmable logic resources of the ASIC's packet processing pipeline 116 that, when executed, causes the pipeline to detect such routing failure scenarios and, in response, modify the pipeline metadata for the packet in one or more of the following four ways:

1. Reset ingress logical interface (inLIF) information in the pipeline metadata to include, among other things, an ID of the ingress L2 logical interface on which the packet was received. This information can be obtained from a data structure (e.g., stack) created for the packet by packet processing pipeline 116 upon packet reception and maintained by the pipeline as the packet is processed.
2. Reset ingress VLAN information in the pipeline metadata to include an ID of the VLAN associated with the packet when the packet entered the network device (i.e., the ingress VLAN ID). Like the inLIF information, this information can be obtained from the data structure created/maintained by packet processing pipeline 116 for the packet.
3. Reset forwarding header index (FWD_LAYER_IDX) information in the pipeline metadata to point to the L2 header of the packet. This step is useful because, in some ASIC implementations, packet processing pipeline 116 uses the forwarding header index to determine which packet header (i.e., the L2 or L3 header) should be examined for forwarding purposes, and the index is initially set to point to the packet's L3 header during the routing attempt. Accordingly, the action of resetting the forwarding header index to point to the packet's L2 header (rather than its L3 header) informs the pipeline that the packet should be bridged rather than routed.
4. Set L2 forwarding information in the pipeline metadata, which enables packet processing pipeline 116 to bridge the packet correctly. This L2 forwarding information can include, among other things, the set of egress front-panel interfaces of network device 300 on which the packet should be sent out, which can be uniquely derived from the ingress VLAN ID.

The result of executing steps (1)-(4) above with respect to the ingress L3 packet is that packet processing pipeline 116 will bridge the packet in accordance with its L2 header rather than routing the packet in accordance with its L3 header.

In certain embodiments, steps (1) and (2) (i.e., resetting the inLIF and ingress VLAN information) are achieved by loading program code for executing these steps into programmable logic element 208 of the pipeline's forwarding stage 202 while steps (3) and (4) are achieved via one or more special traps that are caught and acted upon by the pipeline's trap resolution stage 204. This approach, which is described in further detail in the sections that follow, is useful for programmable network ASIC designs where the forwarding header index and L2 forwarding information cannot be programmatically changed in forwarding stage 202 but can be changed (via a configured trap and corresponding action(s)) in trap resolution stage 204.

In alternative embodiments, all four pieces of pipeline metadata noted above (the inLIF, ingress VLAN, forwarding header index, and L2 forwarding information) can be reset/set programmatically in forwarding stage 202 or in one or more other pipeline stages of packet processing pipeline 116, if the ASIC supports such functionality.

It should be appreciated that FIGS. 1-3 and the foregoing high-level solution description are illustrative and not intended to limit embodiments of the present disclosure. For example, although FIGS. 1 and 3 indicate that programmable network ASIC 112 of network device 100/300 includes a single packet processing pipeline 116, in some embodiments ASIC 112 may include multiple instances of pipeline 116 that are designed to operate in parallel on incoming packet streams from various front-panel interfaces. In these embodiments, bridging fallback module 302 may load program code into or otherwise configure each pipeline instance in the manner described herein.

Further, although FIG. 2 depicts a particular arrangement of pipeline stages in packet processing pipeline 116, other arrangements are possible. For example, the functionality attributed to a particular stage may be split into multiple stages, stages may be combined, stages may be reordered, and so on.

Yet further, although FIG. 2 only shows forwarding stage 202 as comprising programmable logic (i.e., element 208), in alternative embodiments one or more other pipeline stages may also include programmable logic resources.

3. Forwarding Stage Workflow

Figure 4:
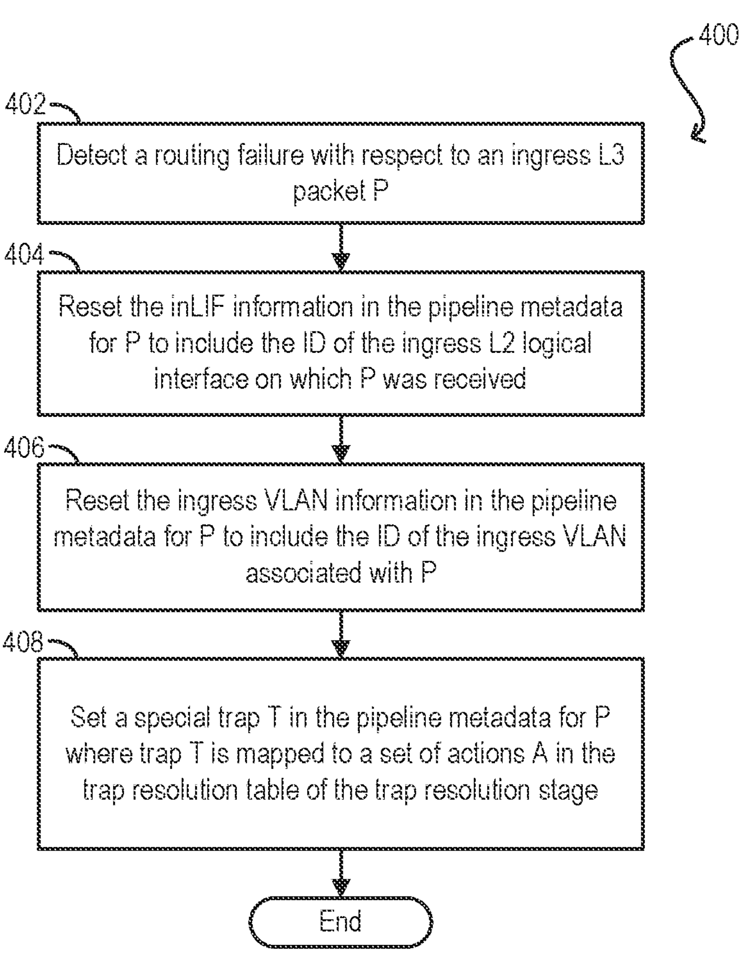
FIG. 4 depicts a forwarding stage workflow in accordance with certain embodiments of the present disclosure.

FIG. 4 depicts a workflow 400 that may be executed by programmable logic element 208 of forwarding stage 202 of packet processing pipeline 116 upon being programmed by bridging fallback module 302 in accordance with the approach described in the foregoing section (i.e., the approach where the inLIF and ingress VLAN information are programmatically reset in the forwarding stage).

Starting with step 402, programmable logic element 208 can detect a routing failure with respect to an ingress L3 packet P (or in other words, can determine that P cannot be routed) despite the existence of valid L3 forwarding information for P in the ASIC's L3 FIB. For example, in one set of embodiments programmable logic element 208 can detect that packet P fails to satisfy one or more criteria/requirements defined by a routing protocol, such as a requirement that P be received on a designated forwarder interface in the case of BIDIR-PIM. The specific nature of this failure detection is fully configurable by the program code programmed into element 208.

In response, programmable logic element 208 can reset the inLIF information in the pipeline metadata for packet P to include the ID of the ingress L2 logical interface on which P was received (step 404) and can reset the ingress VLAN information in the pipeline metadata to include the ID of the ingress VLAN associated with P (step 406). As mentioned previously, these pieces of information can be obtained from the data structures (e.g., stack) maintained by packet processing pipeline 116 for packet P.

Finally, programmable logic element 208 can set a special trap T in the pipeline metadata for packet P, where trap T is mapped to a set of actions A in trap resolution table 210 of trap resolution stage 204 that are designed to reset/set the forwarding header index and L2 forwarding information in the pipeline metadata for P. The mapping between trap T and actions A may be configured in trap resolution table 210 by bridging fallback module 302 or another entity. As described in section (4) below, with trap T in place, trap resolution stage 204 will automatically catch this trap when packet P reaches stage 204 and execute the mapped actions.

4. Trap Resolution Stage Workflow

Figure 5:
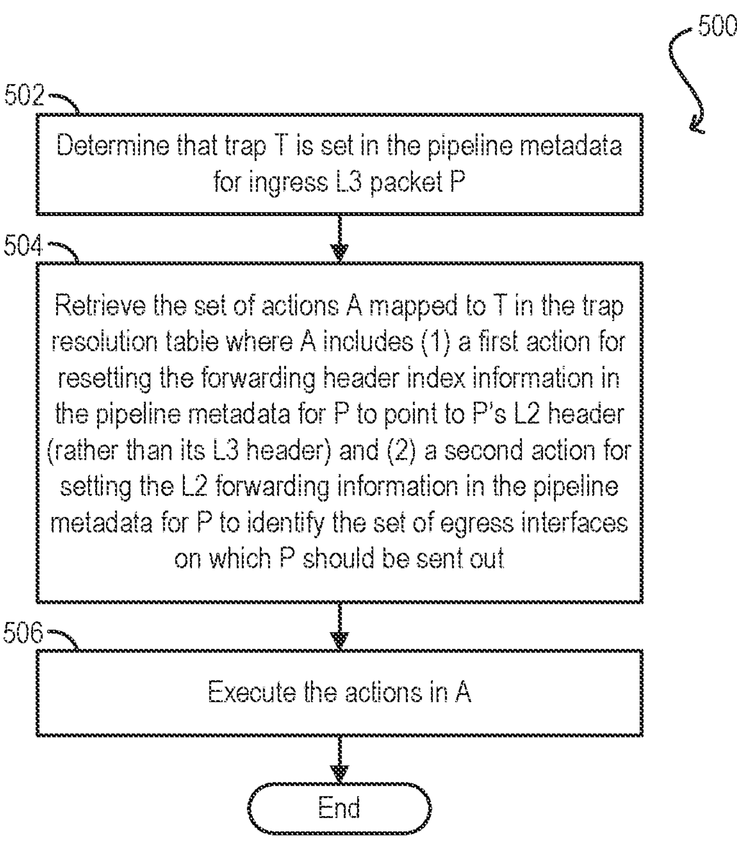
FIG. 5 depicts a trap resolution stage workflow in accordance with certain embodiments of the present disclosure.

FIG. 5 depicts a workflow 500 that may be executed by trap resolution stage 204 of packet processing pipeline 116 for catching and handling special trap T set in the pipeline metadata for packet P per workflow 400. In various embodiments, workflow 500 will be carried out by fixed hardware logic in trap resolution stage 204 (rather than by programmable logic).

Starting with step 502, trap resolution stage 204 can determine that trap T is set in packet P's pipeline metadata.

In response, trap resolution stage 204 can retrieve the set of actions A mapped to trap T in trap resolution table 210, where A includes (1) a first action for resetting the forwarding header index information in the pipeline metadata to point to packet P's L2 header (rather than its L3 header) and (2) a second action for setting L2 forwarding information in the pipeline metadata to identify the set of egress interfaces on which P should be sent out (step 504).

Finally, at step 506 trap resolution stage 204 can execute the actions in action set A (thereby modifying packet P's pipeline metadata accordingly) and the workflow can end.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a programmable network application-specific integrated circuit (ASIC) of a network device, the method comprising:

detecting that a Layer 3 (L3) packet cannot be routed in a scenario where an L3 forwarding information base (FIB) of the network device has valid L3 forwarding information for the L3 packet; and in response to the detecting, modifying, via one or more pipeline stages of a packet processing pipeline of the programmable network ASIC, pipeline metadata associated with the L3 packet, wherein the modifying causes the packet processing pipeline to bridge, rather than route, the L3 packet.

2. The method of claim 1 wherein the modifying is performed, at least in part, by one or more programmable logic elements in the one or more pipeline stages.

3. The method of claim 2 wherein the one or more programmable logic elements are programmed to perform the modifying by software running on a central processing unit (CPU) of the network device.

4. The method of claim 1 wherein the modifying comprises:

resetting ingress logical interface information in the pipeline metadata to identify an ingress Layer 2 (L2) logical interface on which the L3 packet was received.

5. The method of claim 4 wherein the modifying further comprises:

resetting ingress virtual local area network (VLAN) information in the pipeline metadata to identify an ingress VLAN associated with the L3 packet.

6. The method of claim 5 wherein the one or more pipeline stages include a forwarding stage and wherein the resetting of the ingress logical interface information and the ingress VLAN information are performed by a programmable logic element in the forwarding stage.

7. The method of claim 1 wherein the modifying comprises:

resetting forwarding header index information in the pipeline metadata to point to a L2 header of the L3 packet.

8. The method of claim 7 wherein the modifying further comprises:

setting L2 forwarding information in the pipeline metadata, the L2 forwarding information including a set of egress interfaces for sending out the L3 packet.

9. The method of claim 8 wherein the one or more pipeline stages include a trap resolution stage and wherein the resetting of the forwarding header index information and the setting of the L2 forwarding information are performed by the trap resolution stage.

10. The method of claim 9 wherein the trap resolution stage performs the resetting of the forwarding header index information and the setting of the L2 forwarding information by:

determining that a trap has been set in the pipeline metadata in a prior pipeline stage; and in response to determining that the trap has been set:

retrieving a set of actions associated with the trap, the set of actions including a first action to reset the forwarding header index information and a second action to set the L2 forwarding information; and executing each action in the set of actions.

11. The method of claim 10 wherein the trap is set by a programmable logic element in a forwarding stage of the packet processing pipeline upon detecting that the L3 packet cannot be routed.

12. A network device comprising:

a central processing unit (CPU); and a programmable network application-specific circuit (ASIC) with a packet processing pipeline comprising one or more pipeline stages, the programmable network ASIC being configured to:

detect that a Layer 3 (L3) packet cannot be routed in a scenario where an L3 forwarding information base (FIB) of the network device has valid L3 forwarding information for the L3 packet; and in response to the detecting, modify, via the one or more pipeline stages of the packet processing pipeline, pipeline metadata associated with the L3 packet, wherein the modifying causes the packet processing pipeline to bridge, rather than route, the L3 packet.

13. The network device of claim 12 wherein the modifying is performed, at least in part, by one or more programmable logic elements in the one or more pipeline stages.

14. The network device of claim 13 wherein the one or more programmable logic elements are programmed to perform the modifying by software running on the CPU of the network device.

15. The network device of claim 12 wherein the modifying comprises:

resetting ingress logical interface information in the pipeline metadata to identify an ingress Layer 2 (L2) logical interface on which the L3 packet was received; and resetting ingress virtual local area network (VLAN) information in the pipeline metadata to identify an ingress VLAN associated with the L3 packet.

16. The network device of claim 15 wherein the one or more pipeline stages include a forwarding stage and wherein the resetting of the ingress logical interface information and the ingress VLAN information are performed by a programmable logic element in the forwarding stage.

17. The network device of claim 12 wherein the modifying comprises:

resetting forwarding header index information in the pipeline metadata to point to a L2 header of the L3 packet; and setting L2 forwarding information in the pipeline metadata, the L2 forwarding information including a set of egress interfaces for sending out the L3 packet.

18. The network device of claim 17 wherein the one or more pipeline stages include a trap resolution stage and wherein the resetting of the forwarding header index information and the setting of the L2 forwarding information are performed by the trap resolution stage.

19. A method performed by one or more programmable logic elements of a programmable network application-specific integrated circuit (ASIC), the method comprising:

detecting that a Layer 3 (L3) packet cannot be routed; and in response to the detecting, modifying pipeline metadata associated with the L3 packet, wherein the modifying causes the packet processing pipeline to bridge, rather than route, the L3 packet.

20. The method of claim 19 wherein the L3 packet cannot be routed despite the presence of valid L3 forwarding information for the L3 packet in a L3 forwarding information base (FIB) of the network device.

* * * * *